United States Patent
Chang

(10) Patent No.: US 6,414,841 B1
(45) Date of Patent: Jul. 2, 2002

(54) METHOD OF INTEGRATING A MONITOR AND COMPUTER CASING

(75) Inventor: Chia-Yao Chang, Taipei Hsien (TW)

(73) Assignee: Proview Electronics (Taiwan) Co., Ltd. (TW)

( * ) Notice: Subject to any disclaimer, the term of this patent is extended or adjusted under 35 U.S.C. 154(b) by 20 days.

(21) Appl. No.: 09/659,403

(22) Filed: Sep. 11, 2000

(30) Foreign Application Priority Data

Jul. 1, 2000 (TW) .................................. 089202896A01

(51) Int. Cl.⁷ .............................. G06F 1/16; H05K 5/02
(52) U.S. Cl. ........................................ 361/682; 361/683
(58) Field of Search ................................ 361/681, 682, 361/683, 686; 348/836, 838, 839; 248/917, 918, 919; 345/169, 905

(56) References Cited

U.S. PATENT DOCUMENTS

| | | | | |
|---|---|---|---|---|
| 5,247,285 A | * | 9/1993 | Yokota et al. | ............... 345/169 |
| 5,815,369 A | * | 9/1998 | Quesada | ..................... 361/686 |
| 5,822,181 A | * | 10/1998 | Jung | ........................... 361/683 |
| 5,973,916 A | * | 10/1999 | Han | ............................. 361/682 |
| 6,188,569 B1 | * | 2/2001 | Minemoto et al. | .......... 361/683 |
| 6,191,940 B1 | * | 2/2001 | Ma | ............................. 361/681 |

OTHER PUBLICATIONS

U.S. Application Ser. No. 09/632,365 filed Aug. 3, 2000, 27 pages.

* cited by examiner

Primary Examiner—Lynn D. Feild
(74) Attorney, Agent, or Firm—Skjerven Morrill LLP

(57) ABSTRACT

A method of integrating a personal computer casing with a monitor body is disclosed. The method includes providing the computer casing with a top open end, providing the monitor body with a bottom wall configured to cover the top open end and having a leg portion protruding downward from the bottom of a front screen portion of the monitor, providing a first pivotal unit on the leg portion and a second pivotal unit on a front end of the computer casing, engaging the second pivotal unit with the first pivotal unit when the top open end of the computer casing is at a position away from the bottom wall, and subsequently turning the computer casing about the first pivotal unit to place the top open end against the bottom wall so that the top open end is covered by the bottom wall of the monitor.

5 Claims, 5 Drawing Sheets

METHOD OF INTEGRATING A MONITOR AND COMPUTER CASING

BACKGROUND OF THE INVENTION

1. Field of the Invention

The invention relates to a personal computer, more particularly to a method of integrating a personal computer casing with a cathode ray tube-type monitor to form a unitary assembly.

2. Description of the Related Art

Personal computers are very common today, and they are adapted for use in different situations. To suit different demands, personal computers are generally classified into two main types: high-performance professional personal computers that can perform many different functions, and low-price personal computers that can only execute specific or basic functions, e.g., network computers. With simplified functions, network computers require less electronic components, and have the advantages of material cost savings and reduced space. Developing personal computers in which the monitor and the mainframe together with other electronic components are accommodated in a single housing has therefore become a trend. However, the size of such single-housing type personal computers, as well as the arrangement and specifications of the peripherals thereof, is fixed at molding. Therefore, it is not possible to expand the components or upgrade the computer. Besides, for different models of such single-housing type personal computers, different molds have to be used for the housings, which is inconvenient in terms of inventory management. Furthermore, since the mainframe and the monitor are contained in the same computer housing, the entire computer housing has to be dismantled for maintenance, and the high voltage behind the cathode ray tube poses a potential threat to the maintenance technician. In addition, the positions of the connecting ports in the mainframe are fixed, making it impossible for the user to freely change or expand the connecting ports. All in all, such single-housing type computers are limited to their inherent functions and are not available for expansion. Use thereof is therefore very inflexible.

SUMMARY OF THE INVENTION

An object of the present invention is to provide a method of integrating a cathode ray tube-type monitor with a personal computer casing so as to form a unitary assembly which permits relative turning movement of the computer casing and the monitor to open or close the computer casing, thereby providing easy access to the computer casing for maintenance and replacement of components therein.

According to the present invention, a method is provided for integrating a personal computer casing with a monitor body having a front screen portion, and a rear shell portion extending rearwardly from the front screen portion. The method comprises: providing the computer casing with a top open end; providing the monitor body, at the bottom of the front screen portion and the rear shell portion, with a bottom wall which is configured to cover the top open end of the monitor and which has a leg portion protruding downward from the bottom wall beneath the front screen portion; providing a first pivotal unit on the leg portion and a second pivotal unit on a front end of the computer casing, wherein the first and second pivotal units are turnable relative to one another when interengaged; and engaging the second pivotal unit with the first pivotal unit when the open top end of the computer casing is at a position away from the bottom wall of the monitor and subsequently turning the computer casing about the first pivotal unit to place the top open end against the bottom wall so that the top open end is covered by the bottom wall. The method further comprises fastening the rear end of the computer casing to the bottom wall after the top open end abuts against the bottom wall of the monitor body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREPERRED EMBODIMENT

Figure 1:
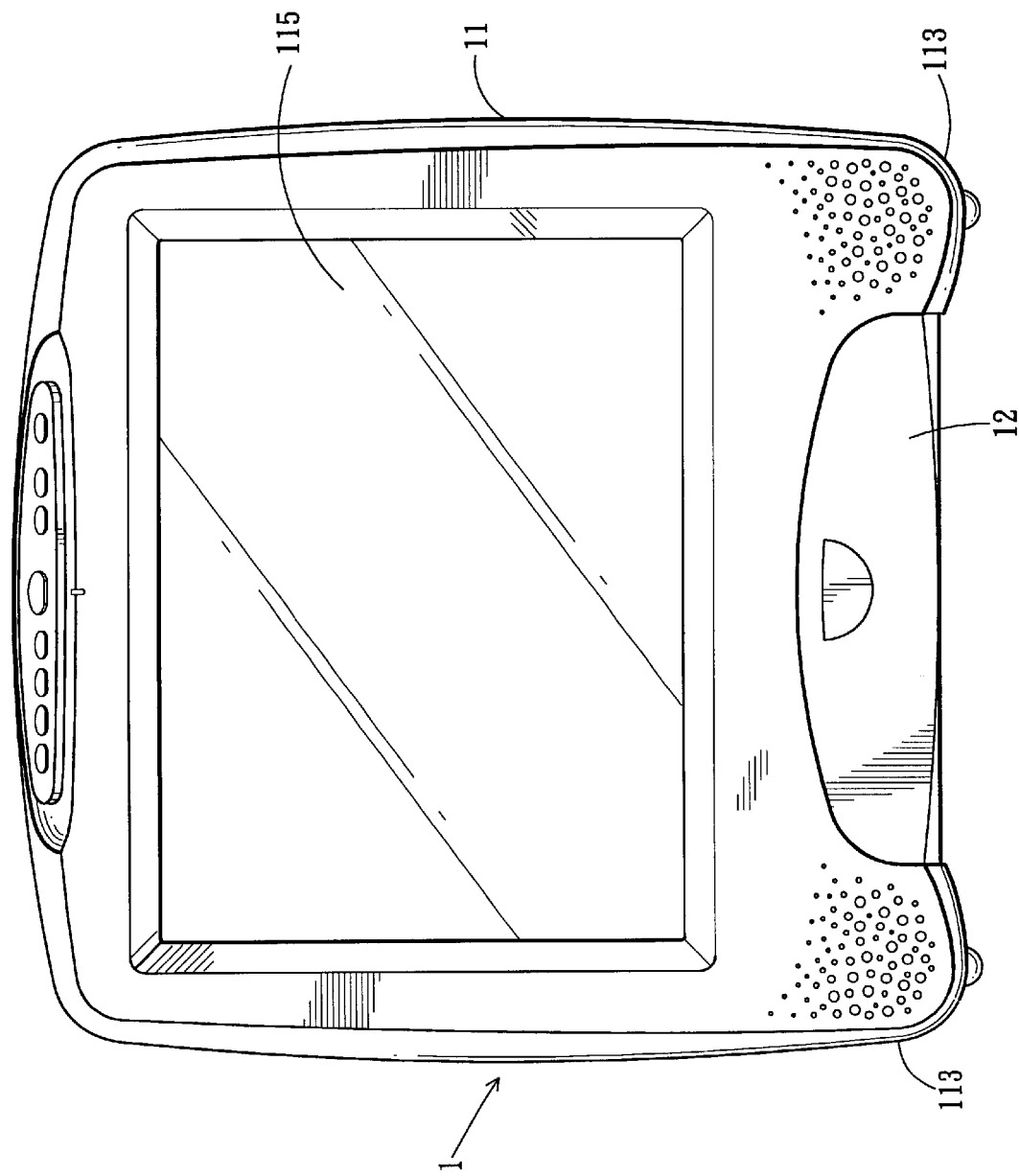
FIG. 1 is a front view of a unitary assembly of a cathode ray tube-type monitor and a computer casing which is formed by a method according to the present invention.
Figure 2:
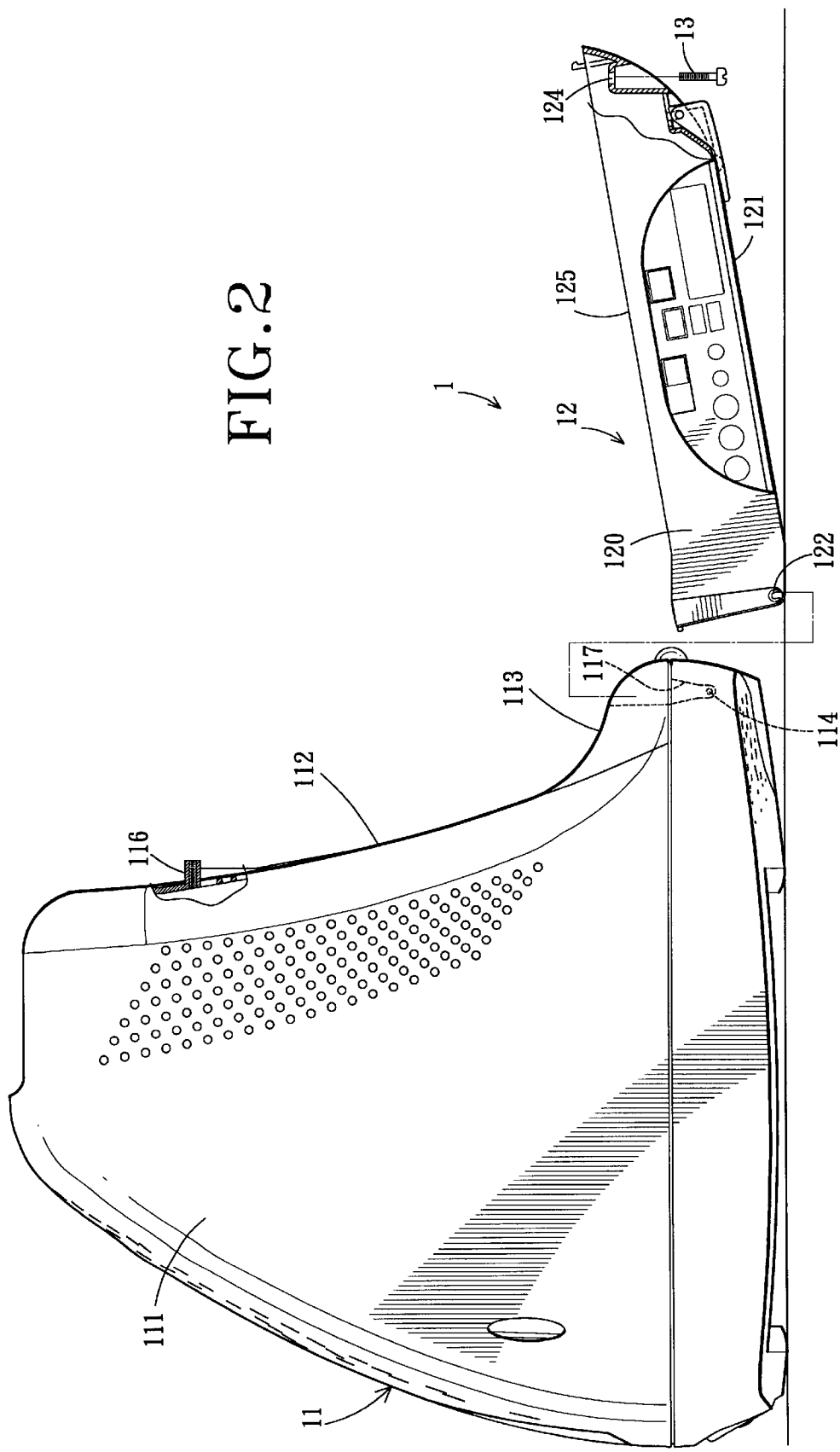
FIG. 2 is an elevation view of the monitor and the computer casing before assembly.
Figure 3:
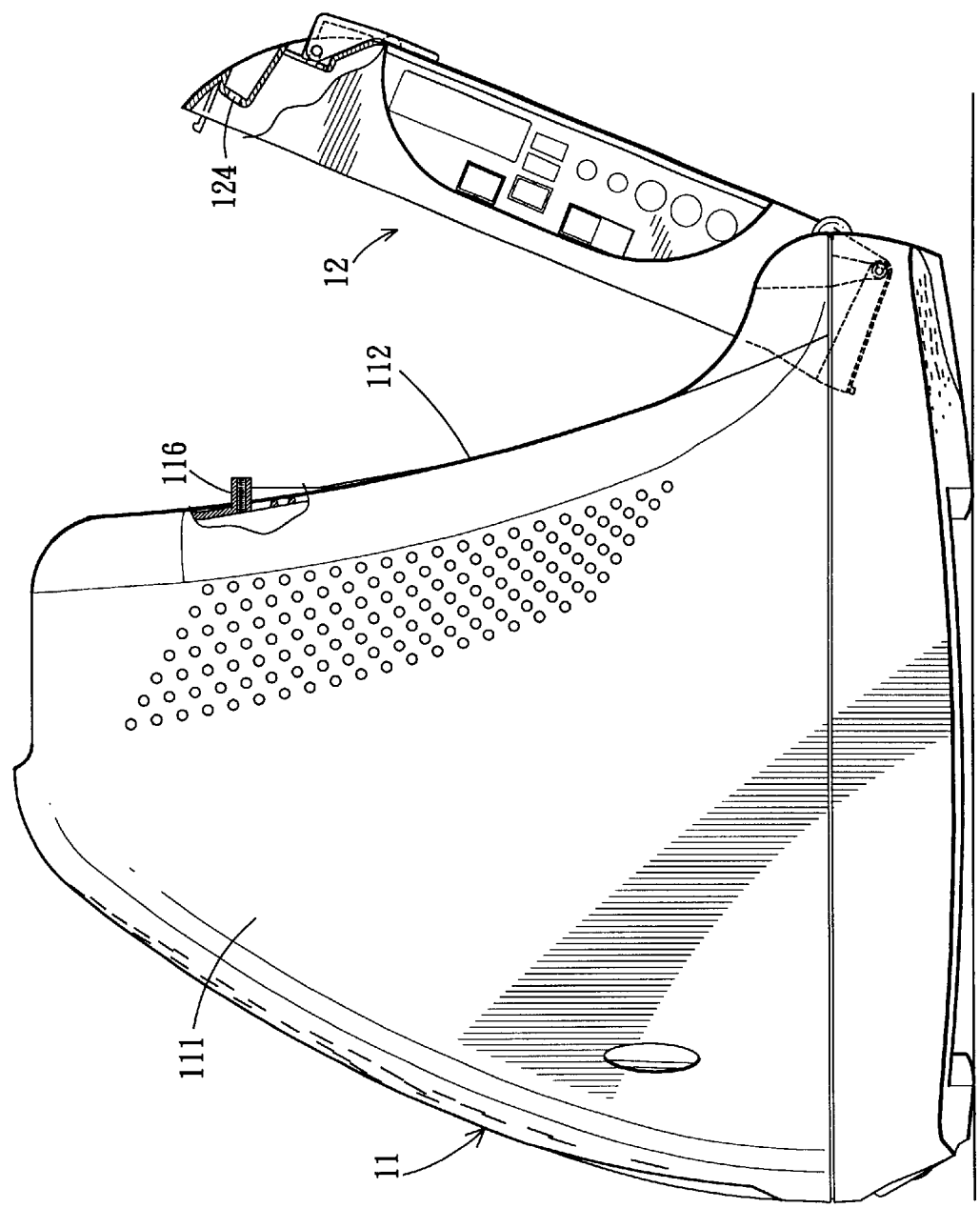
FIG. 3 is an elevational view showing the computer casing connected to the monitor when placed in an open position.
Figure 4:
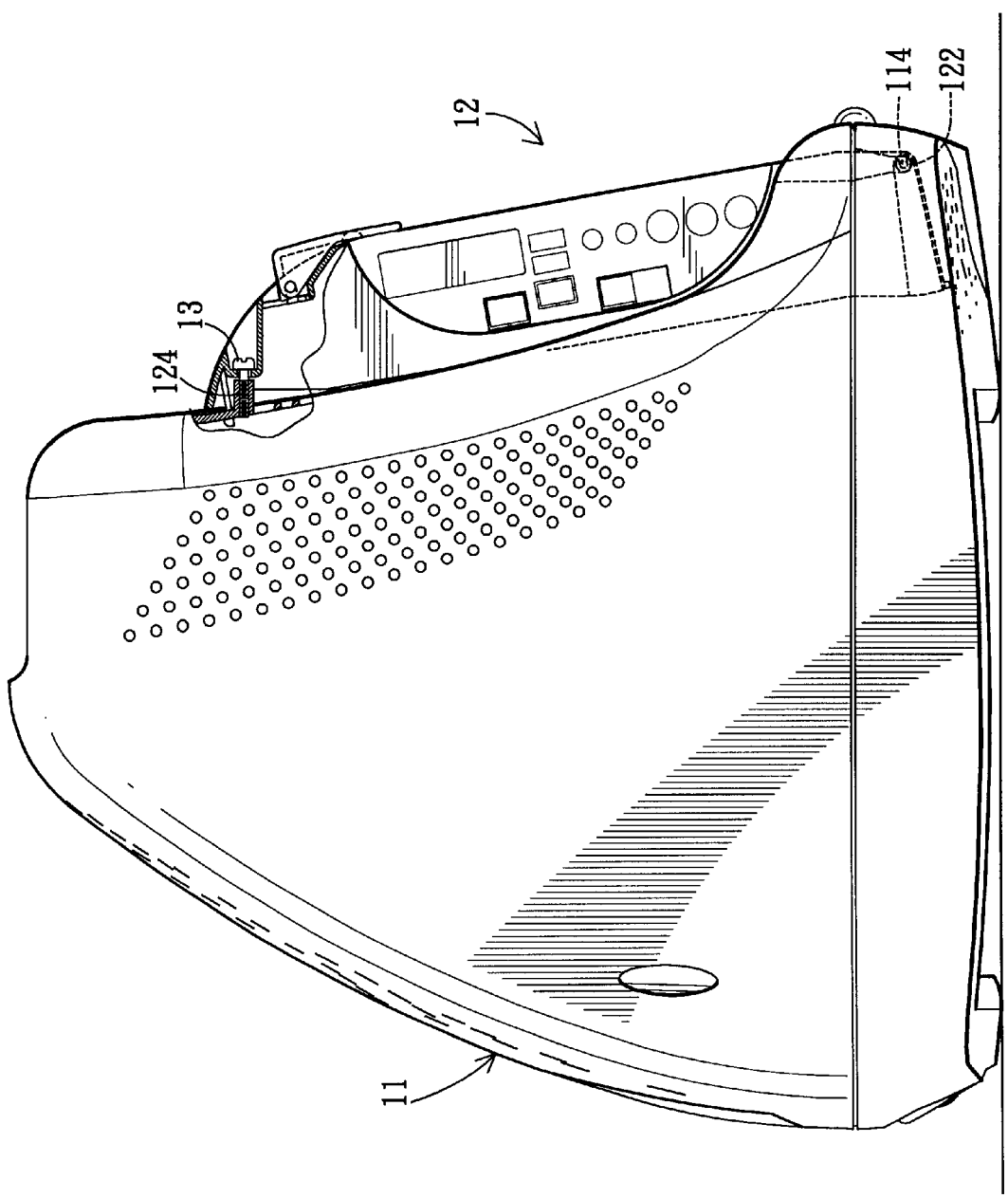
FIG. 4 shows that the computer casing is closed by the monitor.

Referring to FIG. 1, a unitary assembly 1 is formed according to the present invention by integrating a cathode ray tube-type monitor 11 and a personal computer casing. 12 A method of integrating a monitor with a computer casing embodying the present invention is illustrated in FIGS. 2 to 4. Referring to FIGS. 2 to 4 in combination with FIG. 1, the monitor 11 includes a front screen portion 115, a rear shell portion 111 extending rearwardly from the front screen portion 115, and a bottom wall 112. The bottom wall 112 has a leg portion which is divided into a pair of leg members 113 protruding downward from the bottom wall 112 beneath the front screen portion 115 on two sides of the front end of the computer casing 12. A first pivotal unit constituted by a pair of first pivot elements 114, is disposed on the leg members 113. In particular, the first pivot elements 114 are in the form of pivot pins respectively formed in opposite inner wall faces of the leg members 113 on two sides of the computer casing 12. The inner wall faces of the leg members 113 are further formed with guide rails 117 which respectively extend to the first pivot elements or pivot pins 114.

Figure 5:
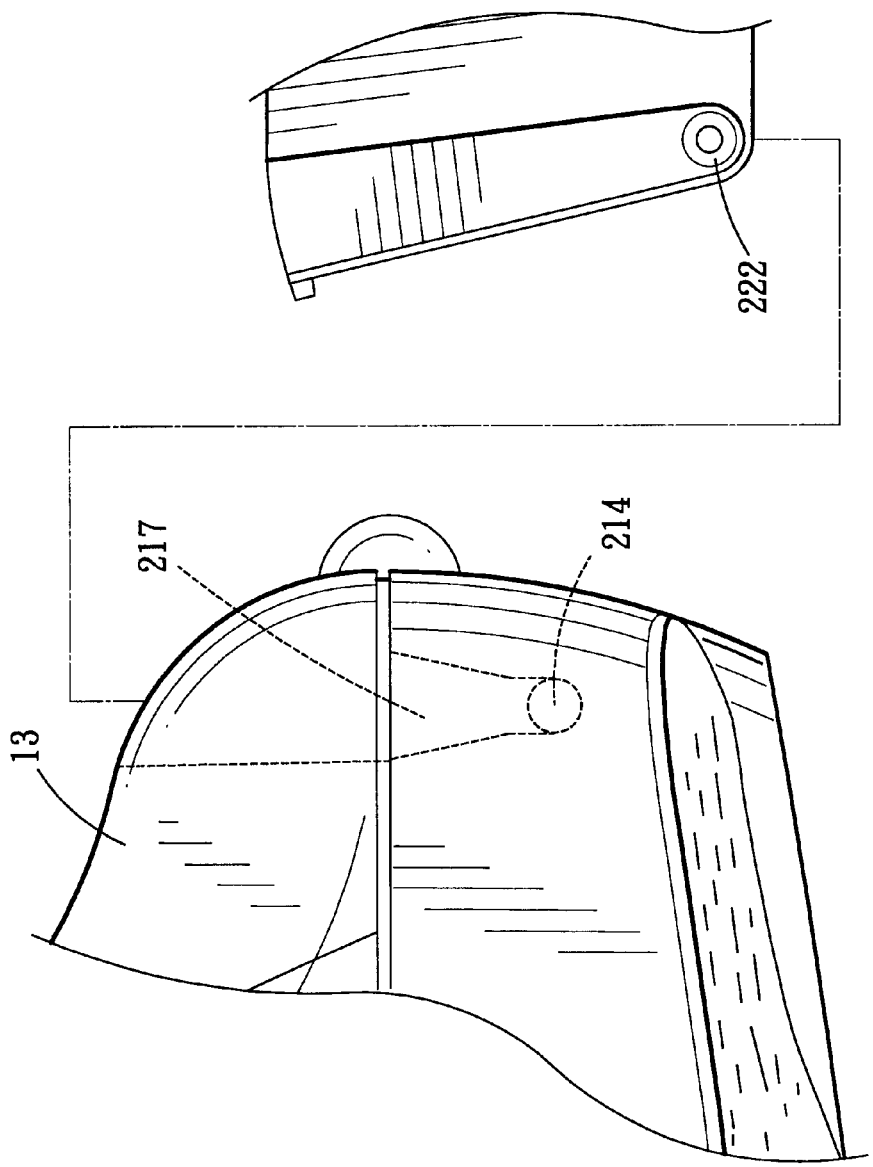
FIG. 5 is an enlarged fragmentary view which shows an alternative configuration of first and second pivotal unite usable in the assembly of FIG. 1.

The computer casing 12 is generally rectangular and is adapted for receiving a mainframe and other interface cards. The computer casing 12 includes a four-sided wall 120, a bottom wall 121, and a top open end 125 for access to the interior of the computer casing 12. At the front end of the computer casing 12 is provided a second pivotal unit which includes a pair of second pivot elements 122. The second pivot elements 122 are formed as protrusions projecting oppositely from the four-sided wall 120 at the front end of the computer casing 12 and have a substantially U-shaped cross-section as best shown in FIG. 5. The second pivot elements 122 are disposed on the four-sided wall 120 at locations confronting the opposite wall faces of the leg members 113 of the monitor 11.

In assembly, the front screen portion 115 of the monitor 11 is first placed downward so as to turn upward the bottom wall 112, and the top open end 125 of the computer casing 12 is arranged to face upward. The front end of the computer casing 12 is then brought adjacent to the leg members 113 of the monitor 11, as shown in FIG. 2, so as to be placed between the opposite inner wall faces of the leg members 113 of the monitor 11 such that the second pivot elements 122 can be slid along the guide rails 117. When the second pivot elements 122 are slid to the first pivot elements or pivot pins 114, they are sleeved snugly onto the respective first pivot elements 122, thereby connecting pivotally thereto. Afterwards, the computer casing 12 is turned about the axis of the first pivot elements or pivot pins 114 and is moved toward the bottom wall 112 of the monitor 11, as shown in FIG. 3. Finally, the top open end 125 of the computer casing 12 abuts against the bottom wall 112 of the monitor 11, thereby closing the top open end 125, as shown in FIG. 4.

After the top open end 125 of the computer casing 12 is closed, the rear end of the computer casing 12 is screwed to the bottom wall 112 of the monitor 11 so as to lock the computer casing 12 to the monitor 11. In particular, female screws 116 are formed at the rear part of the bottom wall 112, and screws 13 are inserted threadedly into the female screws 116 by passing through holes 124 provided in the computer casing 12.

When maintenance or replacement of the components inside the computer casing 12 is needed, the rear end of the computer casing 12 is unfastened from the bottom wall 115 of the monitor 11 and turned to a position shown in FIG. 3 so as to uncover the top open end 125 of the casing 12. The unitary assembly 1 according to the method of the present invention is convenient for maintenance or replacement because the computer casing 12 can be easily closed or opened.

FIG. 5 shows an alternative example of the first and second pivotal units which may be used in the present invention. In this example, the first pivotal unit disposed on each leg member 13 of the monitor 11 is configured as a pivot slot 214 communicated with a guide rail 217, whereas the second pivotal unit disposed on each side of the front end of the computer casing 11 is formed as a pivot shaft 222 of circular cross-section. When the pivot shaft 222 is slid into the corresponding pivot slot 214, the front end of the computer casing 12 is pivotally connected to the leg member 13 of the monitor 11. This pivotal connection also permits the computer casing 12 to turn relative to the monitor 11 to an opened or closed position.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method of integrating a personal computer casing with a monitor body having a front screen portion, and a rear shell portion extending rearwardly from the front screen portion, comprising:

providing the computer casing with a top open end;

providing the monitor body with a bottom wall, beneath said front screen portion and said rear shell portion, which is configured to cover said top open end and which has a leg portion protruding downward from said bottom wall beneath said front screen portion;

providing a first pivotal unit on said leg portion and a second pivotal unit on a front end of said computer casing, said first and second pivotal units being turnable relative to one another when interengaged; and engaging said second pivotal unit with said first pivotal unit when said top open end of said computer casing is at a position away from said bottom wall of said monitor and subsequently turning said computer casing about said first pivotal unit to place said top open end against said bottom wall so that said top open end is covered by said bottom wall.

2. The method as claimed in claim 1, further comprising fastening the rear end of said computer casing to said bottom wall after said top open end abuts against the bottom wall of the monitor body.

3. The method as claimed in claim 2, further comprising dividing said leg portion into two spaced apart leg members to extend on two sides of the front end of said computer casing.

4. The method as claimed in claim 3, further comprising forming said first pivotal unit as a pair of first pivot elements in wall faces of said leg members confronting said computer casing, and forming said second pivotal unit as a pair of second pivot elements on said computer casing adjacent to said first pivot elements.

5. The method as claimed in claim 2, further comprising facing said front screen portion downward so as to turn upward said bottom wall and placing upward said top open end of said computer casing before engaging said first pivotal unit with said second pivotal unit.

\* \* \* \* \*